United States Patent [19]

Nace et al.

[11] 3,894,931
[45] July 15, 1975

[54] METHOD FOR IMPROVING OLEFINIC GASOLINE PRODUCT OF LOW CONVERSION FLUID CATALYTIC CRACKING

[75] Inventors: Donald M. Nace, Woodbury; Hartley Owen, Belle Mead, both of N.J.

[73] Assignee: Mobil Oil Corporation, New York, N.Y.

[22] Filed: Apr. 2, 1974

[21] Appl. No.: 457,312

[52] U.S. Cl. ............... 208/73; 208/15; 208/16; 208/68; 208/74; 208/149; 208/155; 208/78
[51] Int. Cl. . C10g 37/04; C10g 37/06; C01b 33/28
[58] Field of Search ............................ 208/73, 78

[56] References Cited
UNITED STATES PATENTS

| | | | |
|---|---|---|---|
| 2,882,218 | 4/1959 | Jewell | 208/74 |
| 3,689,402 | 9/1972 | Youngblood et al. | 208/93 |
| 3,700,585 | 10/1972 | Chen et al. | 208/111 |
| 3,760,024 | 9/1973 | Cattanach | 260/673 |
| 3,801,493 | 4/1974 | Youngblood et al. | 208/77 |
| 3,847,793 | 11/1974 | Schwartz et al. | 208/70 |
| 3,849,291 | 11/1974 | Owen | 208/78 |
| 3,856,659 | 12/1974 | Owen | 208/80 |

*Primary Examiner*—Delbert E. Gantz
*Assistant Examiner*—G. E. Schmitkons
*Attorney, Agent, or Firm*—Charles A. Huggett; Carl D. Farnsworth

[57] ABSTRACT

A combination operation is described for the production of fuel oil comprising a low conversion cracking operation in the presence of a zeolite conversion catalyst in combination with cyclization of olefin rich feed to produce a combination of products comprising isobutane, gasoline boiling range aromatics and higher boiling material suitable for blending with the light fuel oil product. Isobutylene dimerization and cyclization with a faujasite crystalline zeolite conversion catalyst is described.

9 Claims, 1 Drawing Figure

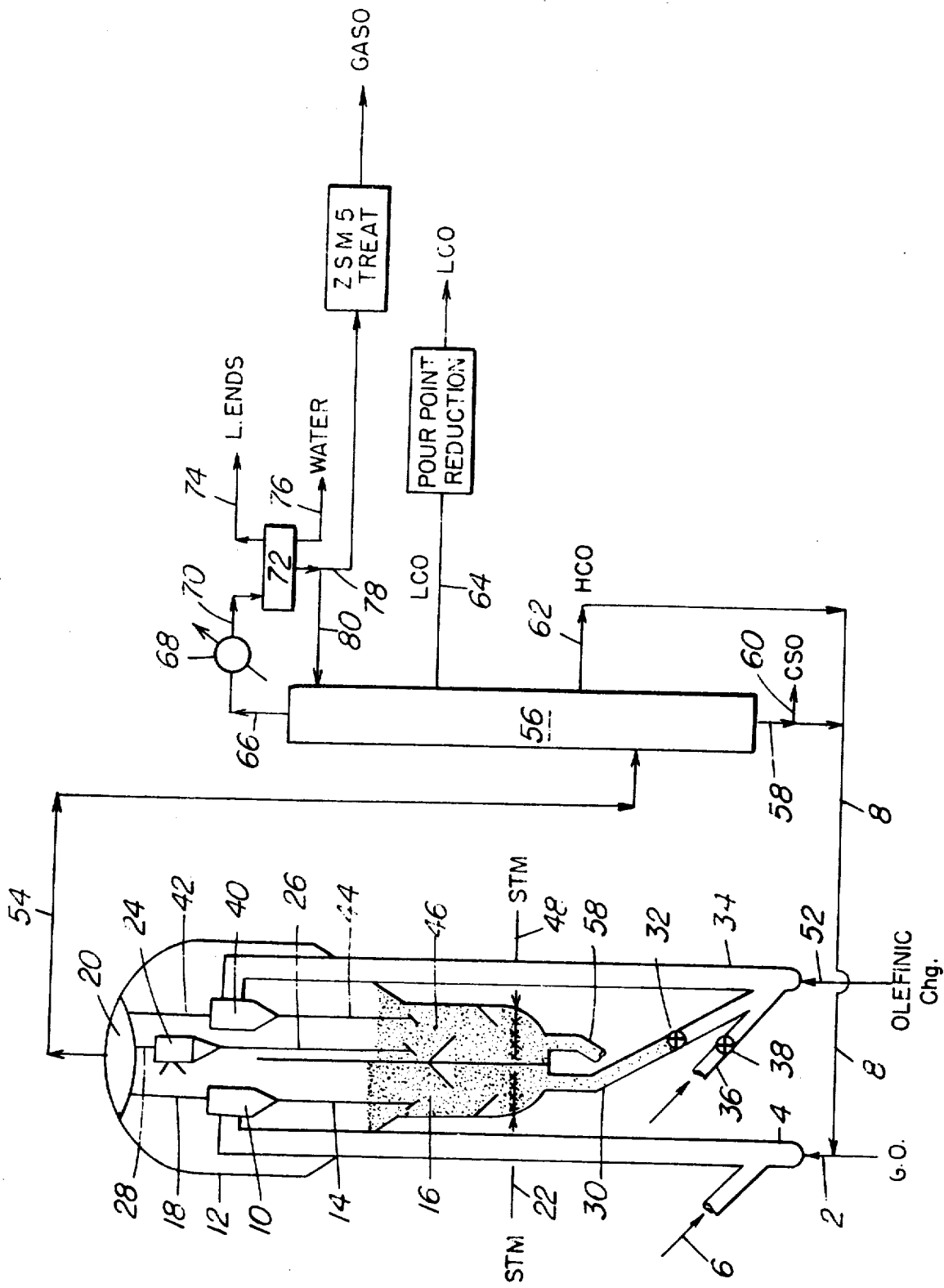

METHOD FOR IMPROVING OLEFINIC GASOLINE PRODUCT OF LOW CONVERSION FLUID CATALYTIC CRACKING

BACKGROUND OF THE INVENTION

Fluid cracking operations to produce a variety of useful products have been practiced since early 1940. A prior art patent of particular interest directed to restricted conversion operations is that of Jewell U.S. Pat. No. 2,882,218.

Fluid cracking of distillation products of crude oil has been practiced since early 1940. Naturally occurring clay type catalysts were initially employed and subsequently replaced with synthetic silica-alumina amorphous type cracking catalysts. These catalysts were more active for accomplishing the desired reactions and thus permitted many processing variations and equipment changes. The development of crystalline aluminosilicate conversion catalyst has provided additional opportunity to develop more efficient conversion operations as well as substantially improving the equipment in which employed. The present invention is particularly concerned with processing crude oil distillation products under conditions to improve the recovery of fuel oil boiling range products of desired pour point using improved crystalline zeolite conversion catalyst of recent development.

SUMMARY OF THE INVENTION

The present invention is concerned with the method and means for effecting chemical reactions. In a more particular aspect the present invention is concerned with a combination chemical conversion operation wherein an olefinic gasoline product recovered from the product of a low conversion catalytic cracking operation designed particularly for the production of light fuel oil is upgraded by a dimerization or cyclization of olefinic constituents with or without the presence of added $C_5$ and lower boiling olefins. More particularly, the present invention is concerned with the dimerization and/or cyclization of olefinic (constituents in the gasoline product of a cracking operation combined with added feed materials such as a mixture of $C_3$ and $C_4$ olefins, a $C_5$ and lower boiling stream rich in olefins or a hydrocarbon stream boiling in the range of $C_6$ to 320°F. rich in olefinic constituents.

In the combination operation of the present invention it is contemplated effecting the conversion of gas oils, cycle oil and residual oils under conditions particularly selected to maximize the production of light cycle oil such as No. 2 fuel oil. In such an operation, low conversion of the gas oil feed improves the production of light cycle oil as well as providing a highly olefinic gasoline product of relatively low octane rating. The highly olefinic gasoline product thus obtained may be octane upgraded, if desired, to a useful product.

In accordance with an aspect of this invention, it has been found that the olefinic gasoline can be catalytically upgraded alone or preferably in combination with added olefin constituents which will dimerize and/or cyclize to produce a product comprising toluene, xylene, trimethyl benzene and material higher boiling than about 320°F. The high boiling component of the product can be combined with the light fuel oil product of the cracking operation. It has been found that the chemical reactions contemplated by this invention can be accomplished with catalytically active faujasite type crystalline zeolites such as a rare earth exchanged X or Y type crystalline faujasite employed alone or in combination with a ZSM-5 type of crystalline zeolite. On the other hand, it has also been found that a ZSM-5 type of crystalline zeolite dispersed in a suitable matrix material may also be employed for this purpose. In addition, it has been found that passing an isobutylene rich feed in contact with a crystalline faujasite conversion catalyst alone under particularly selected operating conditions herein provided for also produced material boiling in the light fuel oil boiling range. The operating conditions employed may be selected from a hydrocarbon residence time within the range of 3 to 20 seconds and preferably less than 17 seconds at a catalyst to oil ratio in the range of 10 to 100 and preferably from 40 to 80 and a temperature in the range of 800°F. to about 900°F. and have been found particularly suitable for the purpose above identified.

In the combination operation herein defined, it is intended to employ one of several different arrangements for performing the conversion operations herein contemplated. That is, conversion of the olefinic rich charge may be accomplished in a separate riser conversion zone, in an upper enlarged portion of a gas oil riser conversion zone, in a dense fluid bed of catalyst, or in the combination of a riser conversion zone discharging into the bottom or lower portion of a dense fluid bed of catalyst. Furthermore, it is contemplated recovering the products of each operation separately rather than in a common fractionation zone. It is also preferred when processing an olefinic fraction boiling in the range of $C_6$-320°F. by contact with a ZSM-5 type of crystalline zeolite to rely upon a dense fluid bed of catalyst for dimerizing particularly olefinic constituents.

In the combinations herein discussed, conversion of a gas oil feed is preferably accomplished in a separate riser conversion zone providing a desired short hydrocarbon residence time under low coke producing operating conditions selected to particularly maximize the production of a light cycle oil. Conversion levels less than 40 volume percent are particularly desired. The light cycle oil product thus produced is thereafter treated with a ZSM-5 type catalyst to further reduce the light cycle oil pour point and this combination operation permits one to use a higher boiling end point in the product distillation column of the low conversion cracking operation thereby further increasing the overall yield of light cycle oil product. Thus the light cycle oil product can boil in the range of 320°F. to about 720°F. In such a combination operation, it has been found that the yield of light cycle oil product having a pour point less than 25° and preferably less than 15°F. can be in excess of 50 vol. percent based on fresh gas oil feed as compared with present day operations providing 20 to 25 vol. percent of light cycle oil of 15 pour point based on fresh gas oil feed.

The catalyst employed in the cracking step of the combination operation of this invention is preferably a faujasite type of crystalline zeolite of the X or Y series provided with a conversion activity level based on the FAI catalyst activity test within the range of about 18 to about 45, it being preferred to restrict the catalyst activity to within the range of 20–30. The FAI catalyst activity test is defined as the conversion obtained to a 356°F. at 90 percent ASTM gasoline product processing a light East Texas gas oil (LETGO) at a 2 c/o;

850°F; 6 WHSV for 5 minutes on stream time. Conversion is defined as 100-cycle oil product.

In a preferred embodiment, the cracking catalyst is a rare earth exchanged "Y" faujasite crystalline zeolite comprising a small amount of a ZSM-5 type of crystalline zeolite up to about 5 wt. percent supported by a silica clay matrix. A mordenite type of crystalline zeolite may be combined with the Y crystalline faujasite in an amount up to about 10 wt. percent, it being preferred to employ not more than about 4 wt. percent of the crystalline mordenite. On the other hand, a limited conversion of the gas oil feed to maximize fuel oil production may be accomplished with a ZSM-5 type of crystalline zeolite alone supported by a silica clay matrix. The ZSM-5 crystalline zeolite may be used in an amount up to about 10 wt. percent.

The fuel oil product of the crystalline zeolite low conversion cracking operation herein defined may be considerably improved as suggested above in its pour point characteristic by a further conversion thereof in the presence of a ZSM-5 type crystalline zeolite under selected operating conditions. To improve the pour point of this material, the light fuel oil products of increased boiling range obtained from the limited conversion cracking operation is passed in contact with a mass of ZSM-5 type of crystalline zeolite maintained preferably as a dense fluid bed of catalyst. In this operation, the light cycle oil product of cracking comprising a relatively high pour point oil of 35° to 60°F. is brought in contact with the ZSM-5 crystalline zeolite conversion catalyst at a temperature maintained within the range of 500° to 900°F., preferably 600° to 800°F. at a pressure within the range of 200 to 600 psig and a liquid hourly space velocity within the range of 0.5 to about 2 v/v/hr. It is preferred to provide hydrogen sufficient to maintain a hydrogen to hydrocarbon mole ratio in the range of 2 to 10/1. In this ZSM-5 contact of the light cycle oil, the pour point may be reduced to at least −35°F. or it may be as 30°as about +4°F.

It will be observed that the operating conditions for reducing the pour point of the light cycle oil product of the restricted or limited hydrocarbon cracking-conversion operation depart in several specific respects from the operating conditions relied upon to upgrade highly olefinic gasoline product simultaneously produced. The combination operation of the present invention is concerned with improving the yields of light cycle oil from gas oil cracking by the combination of dimerizing and/or cyclization of olefinic constituents alone or in combination with added olefinic components as herein provided.

The processing combination of the present invention includes the concept predicated on the finding that at short contact times low boiling olefins can be dimerized and cyclized to useful higher boiling products. For example, butylene can be converted to isobutane in a riser reactor in the presence of a rare earth exchanged Y faujasite crystalline aluminosilicate of the type herein defined. Olefinic feed mixtures comprising $C_3$ and $C_4$ hydrocarbons and hydrocarbon feeds rich in $C_5$ olefins may be similarly processed. In this operation, using a butylene rich feed, the butylene appears to be aromatized thereby giving up hydrogen needed to convert butylene to isobutane. Thus, in an isobutane short refinery operation, the above concept also finds particular use in supplying isoparaffin rich feeds needed for use in alkylation of $C_3$ and $C_4$ olefins which may be the product of particularly a high temperature fluid cracking operation. The hydrogen transfer-cyclization chemical reactions of this concept are of such flexibility that the reactions may be used with particular success in the combination operation of this invention directed particularly to the production of No. 2 fuel oil.

It has been found that at contact times as short as about 7 seconds up to about 17 seconds at a temperature within the range of 850°F. to about 1050°F., isobutylene is converted to isobutane and a liquid product which is mostly di-, tri-, and tetra-methyl benzenes. A key reaction in this process is a cyclodimerization of isobutylene to form aromatics. Also dehydrogenation is accomplished by hydrogen transfer which converts some isobutylene to isobutane molecules. It has been found that conversions as high as 47 percent of an isobutylene charge to isobutane can be accomplished with a 17 percent yield of highly aromatic $C_5+$ gasoline and a remaining 15 percent of alkylatable $C_3$ and $C_4$ olefins. At different conditions the isobutane yield can be adjusted to be just sufficient for complete alkylation of unconverted butylenes and propylene produced. A total alkylate yield under these conditions is about 49 vol. percent of the isobutylene charge. The liquid product obtained in the isobutylene conversion studies at 1050°F. and 850°F. was found to contain an abundance of toluene, xylene and trimethyl benzene as shown by the table below. The toluene thus produced is a desirable constituent in subsequent ZSM-5 forming of low olefinic gasoline. Thus, conversion of olefin feed in a riser to increase production of low boiling aromatics for blending with upgraded gasoline product is a valuable contribution in the overall combination.

| Run<br>Liquid Product | A (1050°F) | B (850°F) |
| --- | --- | --- |
| Initial boiling point, °F. | 203 | 183 |
| 50% point | 336 | 346 |
| 90% point | 493 | 531 |
| 95% point | 572 | 629 |
| % toluene | 8 | 5 |
| % xylene | 30 | 21 |
| % trimethyl benzene | 27 | 26 |
| % of total liquid | 65 | 52 |

It will be observed from the above data that processing the olefin feed under the lower temperature condition produces more product in the light cycle oil boiling range which can be combined with the light fuel oil product of cracking. Lower boiling aromatics obviously go into the gasoline product of the operation.

The trimethyl benzene component of the liquid product is sufficiently high boiling to be blended with the light fuel oil product of the combination operation.

BRIEF DESCRIPTION OF THE DRAWING

The drawing is a schematic arrangement in elevation of apparatus suitable for gas oil cracking and olefin dimerization to improve light cycle oil product yield.

DISCUSSION OF SPECIFIC EMBODIMENTS

Referring now to the drawing by way of example, there is shown a dual riser conversion arrangement discharging into cyclonic equipment housed in an enlarged zone provided for collecting catalyst separated from the riser conversion zones. In this arrangement, the enlarged vessel is separated in the lower portion thereof into two separate stripping zones, so that stripped catalyst separated from the gas oil riser conversion zone may be cascaded to the olefin riser conversion zone along with freshly regenerated catalyst. Combined products of reaction separated from each riser conversion zone is then passed to a product fraction zone.

In the arrangement of the figure, a gas oil boiling range hydrocarbon feed in conduit 2 is charged to the lower end of riser conversion zone 4. Freshly regenerated catalyst at an elevated temperature up to about 1400°F. is introduced by conduit 6 to the lower portion of riser 4 along with heavy cycle oil product in conduit 8. A suspension of catalyst in hydrocarbon charge material in a mixed liquid vapor condition is formed of the components introduced to the lower portion of the riser to provide a mix temperature within the range of 800°F. to about 1100°F. and a catalyst to oil ratio within the range of 3.5 to about 8. The gas-oil catalyst suspension thus formed passes upwardly through the riser under low conversion conditions as herein provided and selected to maximize the production of low pour light cycle oil or No. 2 fuel oil. The suspension passed through riser conversion zone 4 is cyclonically separated at the end of the riser by cyclonic means represented by separator 10. Separator 10 is housed in an enlarged vessel 12 which may be referred to as a catalyst separation and collection vessel. Catalyst cyclonically separated by 10 passes by dipleg 14 to a dense fluid bed of catalyst 16 undergoing stripping in a lower portion of vessel 12. Hydrocarbon vapors separated from catalyst in separator 10 are passed by conduit 15 to a plenum chamber 20 provided in the top portion of vessel 12. Catalyst bed 16 at an elevated temperature in the range of 800°F. to about 1000°F. is stripped with stripping gas such as steam introduced to the lower portion of downwardly moving catalyst bed 16. Stripping gas and stripped hydrocarbon products pass upwardly through catalyst bed 16 into a dispersed phase of catalyst above the dense bed of catalyst and into cyclonic separation means represented by separator 24 provided with catalyst dipleg 26 and vapor withdrawal conduit 28 communicating with plenum chamber 20.

Stripped catalyst is withdrawn from the lower portion of bed 16 and passed by conduit 30 provided with flow control 32 to the lower portion of a second riser conversion zone 34. Hot freshly regenerated catalyst is passed by conduit 36 provided with flow control valve 38 to the lower portion of riser 34 for admixture with the catalyst passed thereto by conduit 30. An olefinic gasiform stream is introduced to the lower portion of riser 34 by conduit 52 for admixture with introduced catalyst to form a suspension at a temperature in the range of 650°F. to about 1100°F. It is contemplated mixing the two streams of catalyst in conduits 30 and 36 before introducing the mixture thereof to riser 34. In riser 34 a relatively high density suspension is formed which preferably comprises from 40 to 80 parts of catalyst per part of olefinic charge. The thus formed high density suspension is passed upwardly through riser 34 for discharge into cyclonic separation equipment represented by separator 40. Separator 40 is provided with vapor withdrawal conduit 42 communicating with plenum chamber 20. A catalyst dipleg 44 passes separated catalyst from separator 40 to a dense fluid bed of catalyst 46. Stripping gas introduced by conduit 48 to the lower portion of bed 46 passes upwardly therethrough and countercurrent to the descending fluid bed of catalyst. Stripping gas and stripped products enter cyclonic equipment 24. Catalyst particles separated by 24 pass by dipleg 26 to catalyst bed 46. Stripped catalyst is withdrawn from a bottom portion of bed 46 by conduit 50 for passage to a catalyst regenerator not shown thus completing the cyclic movement of the catalyst through the system. It will be observed from the above discussion that the catalyst-oil ratio and temperature profile of riser conversion zone 4 relied upon for limited conversion of the gas oil feed to maximize fuel oil product is much different from that employed in riser 34 to accomplish olefin dimerization and cyclization. The catalyst-oil ratio and temperature profile employed in conversion zone 34 is made possible by the cascade of catalyst temperature adjusted with hot freshly regenerated catalyst and feed preheat not shown. As recited above, the olefinic charge may be selected from the combination comprising a mixture of $C_3$ and $C_4$ olefin product of cracking or other available source, a $C_5$ rich olefinic fraction such as one rich in amylene or a higher boiling fraction such as a $C_6$ to 320°F. fraction rich in olefins.

The combined products of conversion and stripping gas passed to plenum chamber 20 are removed therefrom by conduit 54 communicating with fractionation zone 56. In fractionation zone 56, a separation of the products of conversion is made to recover clarified slurry oil from the bottom of the fractionator by conduit 58 communicating with conduit 8 for recycle to riser 4 as desired. On the other hand, the clarified slurry oil may be withdrawn by conduit 60 for other use as desired. A heavy cycle oil is withdrawn by conduit 62 for recycle by conduit 8 to riser 4. A light cycle oil product or No. 2 fuel oil is withdrawn by conduit 64 as product of the process combination. An overhead fraction lower boiling than the light cycle oil and comprising gasoline and lower boiling hydrocarbons are withdrawn from an upper portion of fractionator 56 by conduit 66. The withdrawn material in conduit 66 passes through cooler 68 and conduit 70 to knockout drum 72 wherein condensed liquids such as water and gasoline boiling material is separated from lower boiling gaseous components. The low boiling gaseous components which may comprise $C_5$ and lower boiling hydrocarbons are withdrawn by conduit 74 for passage to a light ends recovery plant not shown wherein a separation is made to recover, for example, olefinic components suitable for use as herein described. Condensed water is removed by conduit 76. A gasoline boiling range fraction separated in drum 72 is withdrawn by conduit 78. A portion of this withdrawn liquid hydrocarbon fraction is recycled by conduit 80 as reflux to the fractionator tower.

Having thus generally described the method and concepts of this invention and discussed specific embodiments going to the very essence thereof, it is to be understood that no undue restrictions are to be imposed by reason thereof except as defined by the following claims.

We claim:

1. A method for improving the yield of light fuel oil and the octane rating of gasoline simultaneously produced in the operation which comprises, converting a relatively high boiling hydrocarbon charge material to a lower boiling light fuel oil product of relatively high pour point by contacting the hydrocarbon charge with a crystalline zeolite cracking catalyst comprising a faujasite conversion catalyst under temperature, pressure, catalyst/oil ratio and a hydrocarbon residence time selected to obtain conversion of the charge to light fuel oil in an amount exceeding about 50 vol. percent based on fresh feed along with a highly olefinic gasoline product, reducing the pour point of the light fuel oil product to within the range of $-35°F$. to $+30°F$. by contact with a ZSM-5 containing crystalline zeolite conversion catalyst, contacting an olefin rich gasiform charge with the crystalline zeolite cracking catalyst above identified for producing light fuel oil at a temperature within the range of $800°F$. to about $1100°F$. and a hydrocarbon feed residence time within the range of 7 to 17 seconds to obtain dimerization and cyclization of olefinic constituents to aromatics and higher boiling material, and mixing high boiling material in the light fuel oil boiling range produced from said olefin rich charge with the light fuel oil product of said limited conversion cracking operation.

2. The method of claim 1 wherein a low octane gasoline product simultaneously produced during said limited conversion cracking operation is octane improved by contact with a ZSM-5 crystalline zeolite in a separate contact zone.

3. The method of claim 1 wherein the high boiling hydrocarbon is a gas oil which is converted to a light cycle oil in a first riser reactor, the olefin rich charge is dimerized and cyclized in a second riser reactor in the presence of used catalyst separated from the first riser reactor and freshly regenerated catalyst is combined with the used catalyst to maintain a catalyst to oil ratio in the second riser reactor within the range of 40 to 80.

4. The method of claim 3 wherein the light cycle oil product of gas oil conversion and olefin dimerization is subjected to pour point reduction treatment with a ZSM-5 crystalline zeolite catalyst.

5. The method of claim 1 wherein dimerizing and cyclizing of the olefin feed is accomplished at a feed residence time within the range of 3 to 20 seconds, a catalyst to oil ratio within the range of 10 to 100 and a temperature restricted to within the range of $800°F$. to about $900°F$.

6. The method of claim 5 wherein the catalyst to oil ratio is within the range of 40 to 80.

7. The method of claim 1 wherein the faujasite cracking catalyst is admixed with a small amount of a crystalline zeolite selected from the group consisting of ZSM-5 and mordenite.

8. The method of claim 1 wherein the olefin rich feed is selected from the group consisting of isobutylene, a mixture of $C_3$ and $C_4$ olefins, a $C_5$ and lower boiling stream rich in olefins, an olefin rich stream boiling in the range of $C_6$ to $320°F$. or a mixture of two or more of the olefin rich feeds comprising the group.

9. The method of claim 3 wherein dimerization of olefinic constituents produces a product comprising toluene and xylene which is available for blending with the gasoline product of the gas oil conversion operation.

* * * * *